US008745041B1

(12) United States Patent
Katragadda et al.

(10) Patent No.: US 8,745,041 B1
(45) Date of Patent: Jun. 3, 2014

(54) RANKING OF GEOGRAPHIC INFORMATION

(75) Inventors: Lalitesh Katragadda, Karnataka (IN);
Keith Ito, Seattle, WA (US); James R. Muller, Palo Alto, CA (US); Ramesh Balakrishnan, San Francisco, CA (US); James C. Norris, Mountain View, CA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 12/001,462

(22) Filed: Dec. 11, 2007

Related U.S. Application Data

(60) Provisional application No. 60/869,695, filed on Dec. 12, 2006.

(51) Int. Cl.
*G06F 7/08* (2006.01)

(52) U.S. Cl.
USPC ............ 707/723; 707/724; 707/748; 701/426

(58) Field of Classification Search
None
See application file for complete search history.

(56) References Cited

U.S. PATENT DOCUMENTS

| | | | |
|---|---|---|---|
| 6,049,755 A | 4/2000 | Lou et al. | |
| 6,208,934 B1 | 3/2001 | Bechtolsheim et al. | |
| 6,847,883 B1* | 1/2005 | Walmsley et al. | 701/200 |
| 2001/0001133 A1 | 5/2001 | Hotta | |
| 2001/0011270 A1* | 8/2001 | Himmelstein et al. | 707/3 |
| 2001/0039506 A1 | 11/2001 | Robbins | |
| 2002/0087526 A1 | 7/2002 | Rao | |
| 2003/0061211 A1* | 3/2003 | Shultz et al. | 707/3 |
| 2003/0182052 A1 | 9/2003 | DeLorme et al. | |
| 2004/0236730 A1* | 11/2004 | Frank | 707/3 |
| 2005/0065916 A1* | 3/2005 | Ge et al. | 707/3 |
| 2005/0108213 A1* | 5/2005 | Riise et al. | 707/3 |
| 2005/0131872 A1* | 6/2005 | Calbucci et al. | 707/3 |
| 2005/0160107 A1* | 7/2005 | Liang | 707/100 |
| 2005/0177569 A1* | 8/2005 | Bowman et al. | 707/7 |
| 2006/0069504 A1* | 3/2006 | Bradley et al. | 701/211 |
| 2006/0074547 A1* | 4/2006 | Kaufman et al. | 701/200 |
| 2006/0106778 A1* | 5/2006 | Baldwin | 707/3 |
| 2006/0174209 A1* | 8/2006 | Barros | 715/764 |
| 2006/0200359 A1 | 9/2006 | Khan et al. | |
| 2006/0200490 A1* | 9/2006 | Abbiss | 707/102 |
| 2007/0011150 A1* | 1/2007 | Frank | 707/4 |
| 2007/0032942 A1 | 2/2007 | Thota | |
| 2007/0112777 A1* | 5/2007 | Field et al. | 707/10 |
| 2007/0226187 A1* | 9/2007 | Beatty et al. | 707/3 |
| 2007/0244866 A1* | 10/2007 | Mishkanian et al. | 707/3 |
| 2007/0260597 A1* | 11/2007 | Cramer | 707/5 |
| 2008/0005079 A1 | 1/2008 | Flake et al. | |

OTHER PUBLICATIONS

"Adding Geographic Scopes to Web Resources," by Silva et al. (May 4, 2006). Available at: Elsevier or sciencedirect.com.*
"Topic-Sensitive PageRank: A Context-Sensitive Ranking Algorithm for Web Search," by Haveliwala, Taher. In: IEEE Trans. Knowledge & Data Engineering, vol. 15, No. 4 (2003). Available at: IEEE.*

(Continued)

*Primary Examiner* — Daniel Kinsaul
(74) *Attorney, Agent, or Firm* — Fish & Richardson P.C.

(57) ABSTRACT

Providing information includes identifying documents that are responsive to a query, some of the documents each being associated with a geographic feature, and providing a list of the documents in a sequence that is determined based on rank scores derived from one or more properties of the geographic features associated with the documents.

17 Claims, 14 Drawing Sheets

(56) References Cited

OTHER PUBLICATIONS

"Fuzzy Systems and Neuro-Fuzzy Systems for the Municipalities Classification," by Hudec and Vujosevic. In: EUROFUSE Anniversary Workshop on "Fuzzy for Better", (D. Radojević, B.DeBaets, J. Fodor, Eds.), pp. 101-110 (2005). Available at: http://www.infostat.sk/cevavstat/fuzzy.prispevky/EUROFUSE05.pdf Last visited: Jan. 7, 2011.

"Path Integration: Issues Concerning the Integration of Data Suitable for the Leisure User," by Chapman et al. In: The ESRI User Conference Proceedings, Jul. 7-11, 2003. Available at: http://proceedings.esri.com/library/userconf/proc03/p0441.pdf Conference overview: http://proceedings.esri.com/library/userconf/proc03/ Last visited: Jan. 7, 2011.

Brin and Page, "The anatomy of a large-scale hypertextual Web search engine," Computer Networks and ISDN Systems, vol. 30, No. 1-7 (Apr. 1998), pp. 107-117.

Jones et al., "Geographical Information Retrieval with Ontologies of Place," in *Lecture Notes in Computer Science*, 2001, vol. 2205, pp. 322-335 (available at: SpringerLink).

Markowetz et al., "Design and Implementation of a Geographic Search Engine", In: $8^{th}$ Int'l Workshop on the Web and Databases, 2005, available at http://dbs.mathematik.uni-marburg.de/publications/myPapers/2005/MCSLS05.pdf, 6 pages.

Vaid et al., "Spatio-textual Indexing for Geographical Search on the Web," In: *Lecture Notes in Computer Science*, 2005, vol. 3633, pp. 218-235 (available at SpringerLink).

\* cited by examiner

US 8,745,041 B1

RANKING OF GEOGRAPHIC INFORMATION

RELATED APPLICATIONS

This application claims priority to U.S. Provisional Patent Application Ser. No. 60/869,695, filed Dec. 12, 2006. This application is related to U.S. patent application Ser. No. 12/001,467, filed Dec. 11, 2007 titled "RANKING OF GEOGRAPHIC INFORMATION", filed concurrently with this application. The contents of the above applications are incorporated herein by reference.

TECHNICAL FIELD

This document generally relates to information retrieval.

BACKGROUND

When users of a conventional information retrieval system search for information about a feature using, for example, a keyword search, a system may return a list of pages that include the keywords and provide the list of pages in a sequence according to rank scores of the pages. The system may generate the rank scores based on any of a number of criteria including inferred opinion and content of the pages. For example, a network's link structure can be used as an indicator of an individual page's value. A link from page A to page B can be interpreted as a vote, by page A, for page B. Votes cast by pages that are themselves important weigh more heavily and help to make other pages important. The page can also be ranked based on locations and frequencies of keywords within the page. For example, if the keywords are located in the HTML title tag of the page, or if the keywords appear more frequently in the page, the rank score of the page may become higher. The usefulness of the search can depend in part on the quality of the rank scores, such as whether more relevant pages are ranked higher than less relevant pages.

SUMMARY

This document describes techniques for using rank scores or rank signals of geographic or geographically related information. In one general aspect, the ranking of the geographic or geographically related information is dependent on the physical and geographic attributes of the geographic features, and independent of the document structure of the information and opinion of other users or pages regarding the information.

In another aspect, in general, documents that are responsive to a query are identified, each document being associated with a geographic feature, and a list of the documents are provided in a sequence that is determined based on rank scores derived from one or more properties of the geographic features associated with the documents.

Implementations may include one or more of the following features. The sequence of the documents can also be determined based on the structures of the documents. The sequence can also be determined based on opinions of other documents with respect to the documents responsive to the query. The method can include identifying a purpose of the query, and identifying a rank score of the geographic feature based on the purpose. The purpose of the query can be identified based on an input received from a user or by evaluating the query. The query can include a key word search using key words that are associated with the geographic feature, and evaluating the query can include evaluating the key words. The rank scores can be determined in real time after the query is received.

In another aspect, in general, documents that are responsive to a query are identified, at least two of the documents being associated with different geographic features; a purpose of the query is identified; rank scores of the geographic features associated with the documents are identified based on the purpose of the query; and the identified documents are provided in a sequence according to the rank scores.

Implementations may include one or more of the following features. The sequence of the identified documents can also be based on the structures of the identified documents and/or opinions of other documents with respect to the identified documents. The purpose of the query can be identified from an input received from a user or by evaluating the query.

In another aspect, in general, a geographical range to be shown on a map is determined; the geographic features that are within the geographical range are determined; which of the geographic features to show on the map are determined based on a scale of the map and rank scores of the geographic features; and the map is rendered to show the determined geographic features. At least some of the rank scores are derived from at least one of (a) a first relationship between the land area occupied by the geographic feature and a total area of land on Earth, and (b) a second relationship between the water area occupied by the geographic feature and a total area of water on Earth.

Implementations may include one or more of the following features. The first relationship can include a ratio of a first logarithmic function of the geographic feature and a second logarithmic function of the total area of land on Earth. The second relationship can include a ratio of a first logarithmic function of the geographic feature and a second logarithmic function of the total area of water on Earth.

In another aspect, in general, geographic features within a geographical range of a map are identified; rank scores of the geographic features are identified based on the purpose of the map; which of the geographic features to show on the map are identified based on the rank scores of the geographic features; and the map showing the identified geographic features is generated.

Implementations may include one or more of the following features. The purpose of the map can include at least one of tourism, housing, and investment. The purpose of the map can be identified based on, for example, information about a client that requested the map.

In another aspect, in general, geographic features within a geographical range of a map are identified, and rank scores of the geographic features are received, the rank scores being determined in real time based on current information about the geographic features. Which of the geographic features to show on the map are identified based on the rank scores of the geographic features, and the map showing the identified geographic features is generated.

Implementations may include one or more of the following features. The method can include incrementally updating the rank scores using the current information.

In another aspect, in general, navigation information is provided. A plurality of routes from a first location to a second location are determined, each route including a plurality of geographic features; one of the plurality of routes is selected based on rank scores of the geographic features of the plurality of routes, wherein the rank scores are determined based on one or more properties of the geographic features and a purpose of the navigation information; and information about the selected route is provided.

Implementations may include one or more of the following features. The rank score of one of the geographic features can be determined based on the rank score of another geographic feature. A request for the navigation information can be received and a purpose of the request can be identified.

In another aspect, in general, a plurality of routes from a first location to a second location are determined, each route including a plurality of geographic features; rank scores of the geographic features are received, the rank scores being determined in real time based on current information about the geographic features; one of the plurality of routes is selected based on the rank scores of the geographic features; and information about the selected route is provided.

Implementations may include one or more of the following features. The rank scores are incrementally updated using the current information.

In another aspect, in general, a system is provided, in which the system includes a search engine to identify documents that are responsive to a query, some of the documents being associated with geographic features, and provide the documents in a sequence that is determined at least partially based on rank scores derived from one or more properties of the geographic features associated with the documents.

Implementations may include one or more of the following features. The rank scores derived from one or more properties of the geographic features associated with the documents can be independent of the structures of the documents. The rank scores can be updated in real time when the search engine requests the rank scores.

In another aspect, in general, a system for providing a map service includes a map server to receive a request for a map having a geographical range, identify geographic features within the geographical range, identify rank scores of the geographic features based on the purpose of the map, identify which of the geographic features to show on the map based on the rank scores of the geographic features, and generate the map showing the identified geographic features.

In another aspect, in general, a system for rendering a map is provided, in which the system includes a map server to receive a request for a map having a geographical range and identify geographic features within the geographical range. The map server receives rank scores of the geographic features, the rank scores being determined in real time based on current information about the geographic features. The map server identifies which of the geographic features to show on the map based on the rank scores of the geographic features, and generates the map showing the identified geographic features.

Implementations may include one or more of the following features. The map server can continuously receive rank scores that are updated in real time, and update the map using the updated rank scores.

In another aspect, in general, a system for providing navigation information includes a route planning module to provide navigation information, wherein the route planning module is configured to determine a plurality of routes from a first location to a second location, each route includes a plurality of geographic features, select one of the plurality of routes based on rank scores of the geographic features of the plurality of routes, wherein the rank scores are determined based on one or more properties of the geographic features and a purpose of the navigation information, and provide information about the selected route.

In another aspect, in general, a system for providing navigation information is provided, in which the system includes a route planning module that is configured to determine a plurality of routes from a first location to a second location, each route including a plurality of geographic features. The route planning module receives rank scores of the geographic features, the rank scores being determined in real time based on current information about the geographic features. The route planning module selects one of the plurality of routes based on rank scores of the geographic features, and provides information about the selected route.

In another aspect, in general, a system is provided in which the system includes means for identifying documents that are responsive to a query, some of the documents each being associated with a geographic feature, and means for providing a list of the documents in a sequence that is determined based on rank scores derived from one or more properties of the geographic features associated with the documents.

In another aspect, in general, a system is provided in which the system includes means for identifying geographic features within a geographical range of a map, means for receiving rank scores of the geographic features, the rank scores being determined in real time based on current information about the geographic features, means for identifying which of the geographic features to show on the map based on the rank scores of the geographic features, and means for generating the map showing the identified geographic features.

In another aspect, in general, a system is provided in which the system includes means for determining a plurality of routes from a first location to a second location, each route comprising a plurality of geographic features, means for receiving rank scores of the geographic features, the rank scores being determined in real time based on current information about the geographic features, means for selecting one of the plurality of routes based on the rank scores of the geographic features, and means for providing information about the selected route.

In another aspect, in general, information about geographic features is received, and documents are identified based on the information, each document being associated with one of the geographic features. A rank score is generated for each document based on one or more properties of the geographic feature associated with the document.

Implementations may include one or more of the following features. In some examples, generating the rank score can include generating the rank score based on at least one of the area occupied by the geographic feature, the population density of the geographic feature, the total length of roads of the geographic feature, economic factors associated with the geographic feature, infrastructure quality of the geographic feature, and visual prominence of the geographic feature. In some examples, generating the rank score can include generating the rank score based on a confidence score associated with the source of the information, the confidence score being higher for a more reliable source. In some examples, generating the rank score of a first geographic feature can include generating the rank score based on a relationship between the first geographic feature and a second geographic feature.

In some examples, the geographic features can include at least one of a geopolitical unit, a natural structure, and a man-made structure. In some examples, when the geographic feature includes a building, the rank score can be generated based on at least one of the number of floors of the building and the total floor area of the building. In some examples, when the geographic feature includes a road, the rank score can be generated based on at least one of the total length of the road, the width of the road, the number of lanes of the road, the type of paving of the road, the capacity of the road, and the degree of networking of the road. The degree of networking can include at least one of the number of intersections with other roads, the degree of access to the general public, the complexity of intersections with other roads, and the prominence of intersections with other roads.

A plurality of rank scores can be generated for one of the geographic features, different rank scores being associated with different uses of the document associated with the geographic feature. Generating the plurality of rank scores can include generating at least one of a first rank score for use in responding to a query for sightseeing, a second rank score for use in responding to a query for a place to live, and a third rank score for use in responding to a query for a place to purchase. Functions for generating the rank scores can be identified, each of the functions being identified based on one of the uses of the document. The documents can be generated. Receiving information about one of the geographic features can include receiving a document that describes the geographic feature, and generating a rank score can include generating the rank score independent of the structure of the document describing the geographic feature.

The rank scores can be provided to at least one of a search engine, a map application, and a navigation application. Upon receiving a request for a rank score from at least one of a search engine, a map application, and a navigation application, the rank score can be generated in real time based on current information. Generating the rank score for a document associated with a first geographic feature can include generating the rank score based on other geographic features located within the first geographic feature. A type of a geographic feature can be identified, and a ranking function can be identified based on the type of the geographic feature. Based on the identified type, a ranking scheme can be determined for use in determining the rank score for the document associated with the geographic feature. The ranking scheme can include at least one of area based ranking, density based ranking, aggregate based ranking, visual prominence ranking, transportation network ranking, and network based ranking.

In another aspect, in general, information about geographic features is received, each geographic feature occupying a predetermined amount of land area or water area. A rank score is generated for each geographic feature based on at least one of (a) a first relationship between the land area occupied by the geographic feature and a total area of land on Earth, and (b) a second relationship between the water area occupied by the geographic feature and a total area of water on Earth.

Implementations may include one or more of the following features. The first relationship can include a ratio of a first logarithmic function of the geographic feature and a second logarithmic function of the total area of land on Earth. The second relationship can include a ratio of a first logarithmic function of the geographic feature and a second logarithmic function of the total area of water on Earth.

In another aspect, in general, information about a geographic feature is received, a plurality of contexts related to the geographic feature are identified, and a rank score is generated for the geographic feature for each of the plurality of contexts.

Implementations may include one or more of the following features. The plurality of contexts can include at least one of tourism, housing, and investment. In some examples, the rank scores can be generated based on at least one of the area occupied by the geographic feature, the population density of the geographic feature, the total length of roads of the geographic feature, economic factors associated with the geographic feature, infrastructure quality of the geographic feature, and visual prominence of the geographic feature. In some examples, the rank scores can be generated based on a confidence score associated with the source of the information, the confidence score being higher for a more reliable source. In some examples, the rank scores of the geographic feature can be generated based on a relationship between the geographic feature and at least another geographic feature.

In some examples, the geographic feature can include a road, and the rank scores can be generated based on at least one of the total length of the road, the width of the road, the number of lanes of the road, the type of paving of the road, the capacity of the road, and the degree of networking of the road. The degree of networking can include at least one of the number of intersections with other roads, the degree of access to the general public, the complexity of intersections with other roads, and the prominence of intersections with other roads. In some example, the rank scores can be generated based on at least one of (a) a first relationship between the land area occupied by the geographic feature and a total area of land on Earth, and (b) a second relationship between the water area occupied by the geographic feature and a total area of water on Earth.

In another aspect, in general, a request for a rank score of a geographic feature is received, the geographic feature being associated with a plurality of rank scores, each rank score being associated with a particular context. A rank score based on a context of the request is identified, and the identified rank score is provided.

Implementations may include one or more of the following features. The rank score can be provided to at least one of a search engine, a map application, and a navigation application. The context can include at least one of tourism, housing, and investment.

In another aspect, in general, information about a first geographic feature is received, and a first rank score is generated for the first geographic feature using a function of a second rank score of a second geographic feature.

Implementations may include one or more of the following features. The first geographic feature can include a transportation network and the second geographic feature can include a segment of the transportation network. The method can include providing the rank score to at least one of a search engine, a map application, and a navigation application. The second geographic feature can be located within the first geographic feature.

In another aspect, in general, information about geographic features having names that share a common word is received, and a rank score for each of the geographic features is generated based on one or more properties of the geographic feature.

Implementations may include one or more of the following features. The geographic features may include cities. A relative ranking of two or more of the geographic features is determined based on the rank scores.

In another aspect, in general, information about a transportation feature is received, and a rank score is generated for the transportation feature based on at least one of (a) total length of the transportation feature, (b) population density along the transportation feature, (c) number and importance of businesses along the transportation feature, and (d) degree of networking of the transportation feature.

Implementations may include one or more of the following features. The degree of networking of the transportation feature can include at least one of (a) the number of intersections with other transportation features, and (b) accessibility to the general public. The transportation feature can include at least one of a road, a railway, a ferry way, and an air way.

In another aspect, in general, information about a geographic feature is received, a ranking function is identified, the ranking function being based on at least one of density attributes, aggregate attributes, and visual prominence of the geographic feature, and a rank score is generated for the geographic feature using the ranking function and the information.

Implementations may include one or more of the following features. The density attributes can include at least one of population density, degree of urbanization, and infrastructure density. The aggregate attributes can include at least one of total population, total length of roads, total number of households having high speed Internet connection, total number of houses or stores, and total number of crimes over a given period of time. The visual prominence can be determined based on at least one of a height of the geographic feature, a width of the geographic feature, and proximity of the geographic feature to a transportation feature.

In another aspect, in general, new information about a geographic feature is received, a ranking function used to generate a rank score of the geographic feature is identified, a first portion of the ranking function that is affected by the new information is identified, and the rank score of the geographic feature is incrementally updated by re-computing the first portion of the ranking function using the new information without re-computing a second portion of the ranking function that is not affected by the new information.

Implementations may include one or more of the following features. The geographic feature can include a transportation network, in which the first portion of the ranking function is associated with a first segment of the transportation network, and the second portion of the ranking function is associated with a second segment of the transportation network. Incrementally updating the new rank score can include using a reverse function of the ranking function. The ranking function can include one of a logarithmic function and an exponential function, and the reverse function can include the other of the logarithmic function and the exponential function. Incrementally updating the rank score can include using the reverse function and a current rank score of the geographic feature to determine a value, updating the value using the new information, and updating the rank score using the ranking function and the updated value to determine a new rank score.

In another aspect, in general, a first rank score of a first geographic feature is updated, other geographic features whose rank scores are based on the first rank score are identified, and the rank scores of the other geographic features are iteratively updated using the updated first rank score. The first rank score is updated based on the updated rank score of at least one of the other geographic features.

Implementations may include one or more of the following features. One of the other geographic features can include a transportation network, the first geographic feature can be accessible by the transportation network, the rank score of the transportation network can depend on the first geographic feature, and the rank score of the first geographic feature can depend on the transportation network.

In another aspect, in general, a system for ranking geographic information is provided, in which the system includes a rank engine to receive information about geographic features, identify documents based on the information, each document being associated with one of the geographic features, and generate and/or update a rank score for each document based on one or more properties of the geographic feature associated with the document.

Implementations may include one or more of the following features. The system can include a database to store the documents. The system can include a database to store confidence scores associated with sources of the information, the confidence score being higher for a more reliable source. The system can include a content aggregator to aggregate information received from multiple sources. The system can include instruments to provide the information about the geographic features. The system can include an interface to receive the information about the geographic features from users. The system can include a commercial database that includes the information about the geographic features. The system can include a web crawler for extracting the information from web pages.

The system can include a search engine to provide a list of documents that are responsive to a query, the search engine using the rank scores to determine a sequence of the documents. The system can include a web application to render a map using the rank scores to determine which geographic features to show on the map. The system can include a navigation application to generate navigation information using the rank scores to select road segments.

The rank engine can generate the rank score based on at least one of the area occupied by the geographic feature, the population density of the geographic feature, the total length of roads of the geographic feature, economic factors associated with the geographic feature, infrastructure quality of the geographic feature, and visual prominence of the geographic feature. The rank engine can generate the rank score based on a confidence score associated with the source of the information, the confidence score being higher for a more reliable source. The rank engine can generate the rank score of a first geographic feature based on a relationship between the first geographic feature and a second geographic feature.

In some examples, when the geographic feature includes a building, the rank engine can generate the rank score based on at least one of the number of floors of the building and the total floor area of the building. In some examples, when the geographic feature includes a road, the rank engine can generate the rank score based on at least one of the total length of the road, the width of the road, the number of lanes of the road, the type of paving of the road, the capacity of the road, and the degree of networking of the road. The degree of networking can include at least one of the number of intersections with other roads, the degree of access to the general public, the complexity of intersections with other roads, and the prominence of intersections with other roads.

The rank engine can generate a plurality of rank scores for one of the geographic features, different rank scores being associated with different uses of the document associated with the geographic feature. The rank engine can generate at least one of a first rank score for use in responding to a query for sightseeing, a second rank score for use in responding to a query for a place to live, and a third rank score for use in responding to a query for a place to purchase. The rank engine can identify functions for generating the rank scores, each of the functions being identified based on one of the uses of the document. The rank engine can generate the documents. The rank engine can generate the rank score for a document associated with a first geographic feature based on other geographic features located within the first geographic feature.

In another aspect, in general, a system for ranking geographic information is provided, in which the system includes a rank engine to receive new information about a geographic feature, identify a ranking function used to generate a rank score of the geographic feature, identify a first portion of the ranking function that is affected by the new information, and incrementally update the rank score of the geographic feature by re-computing the first portion of the ranking function using the new information without re-computing a second portion of the ranking function that is not affected by the new information.

In another aspect, in general, a system for ranking geographic information is provided, in which the system includes a rank engine to update a first rank score of a first geographic feature, identify other geographic features whose rank scores are based on the first rank score, and iteratively update the rank scores of the other geographic features using the updated first rank score, including further updating the first rank score based on the updated rank score of at least one of the other geographic features.

In another aspect, in general, a system for ranking geographic information is provided, in which the system includes means for receiving information about geographic features, means for identifying documents based on the information, each document being associated with one of the geographic features, and means for generating and/or updating a rank score for each document based on one or more properties of the geographic feature associated with the document.

Implementations may include one or more of the following features. The system includes means for providing a list of documents that are responsive to a query, using the rank scores to determine a sequence of the documents. The system includes means for rendering a map using the rank scores to determine which geographic features to show on the map. The system includes means for generating navigation information using the rank scores to select road segments. The means for generating and/or updating the rank score generates and/or updates the rank score based on a confidence score associated with the source of the information, the confidence score being higher for a more reliable source. The means for generating and/or updating the rank score generates a plurality of rank scores for one of the geographic features, different rank scores being associated with different uses of the document associated with the geographic feature.

These and other aspects and features, and combinations of them, may be expressed as methods, apparatus, systems, means for performing functions, program products, and in other ways.

Advantages of the aspects and features may include one or more of the following. Ranking information can be collected from a large number of users so that rank scores for a large number of geographic features can be established in a relatively short amount of time. Rank scores for a large number of geographic features can be determined and updated quickly in real time. The rank scores can be determined based on various factors so that the rank scores more accurately reflect the importance of the geographic features to users. The relationships among various geographic features can be accounted for in determining the rank scores. The rank scores can be used to provide better map services, and better direction and navigation services. The rank scores can also be used to provide more relevant information in response to search queries.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

1. System Overview

Figure 1:
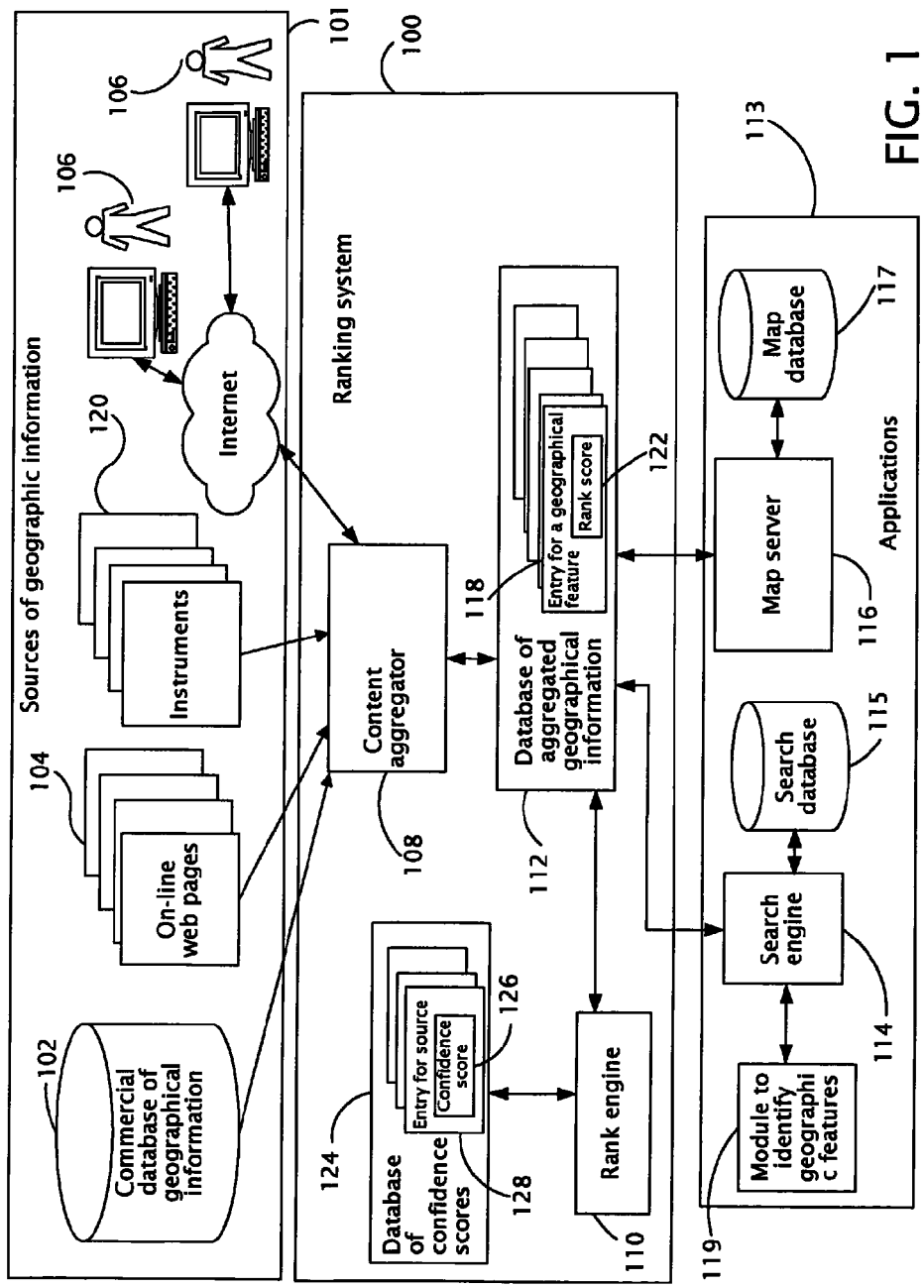
FIG. 1 is a schematic diagram of a system for providing rank scores of geographic information.

FIG. 1 is a schematic diagram of an example of a system 100 for ranking geographic information (i.e., information about geographic features) based on properties of the geographic features or the usefulness of the features to users. The ranking of the geographic information can be performed without regard to document structure of the information describing the geographic features and opinions of other users or documents with respect to the geographic information. Such ranking is useful in, e.g., improving searching of information about geographic features and enhancing the quality of computer-generated maps.

A geographic feature, as used herein, refers to an element that has geographic coordinates and can be represented on a map (e.g., road map, political map, land use map, topographic map, geologic map, marine map, aviation map, biodiversity map, mineral map, population density map, economic development map, traffic map, crime map, gas and oil well map, zoning map, etc.). Geographic features can include, for example, continents, countries, states, provinces, cities, towns, buildings, businesses such as department stores and restaurants, schools, gas stations, power plants, dams, airports, train stations, docks, historical monuments, parks, railways, highways, local roads, bikeways, ferry ways, airways, mountains, oceans, lakes, rivers, and beaches, etc.

In this description, the term "geographic information" refers to information associated with a geographic feature (e.g., shape, size of the feature, its attributes, e.g., number of lanes in a road, surface, height of building, etc.) or that includes geographically related information (i.e., information about geographically related features, such as whether one feature is linked to another feature through a road, distance from another feature, association, etc.).

The geographic information can be derived from a number of sources 101, such as one or more commercial databases 102, on-line web pages 104, information provided by users 106 through a web-based user interface (e.g., a wiki), and information provided by instruments 120 (e.g., sensors on satellites and surveillance cameras along roads).

The commercial databases 102 can include, e.g., Tiger Map Database, available from the U.S. government, or its commercial derivatives. The commercial databases 102 may include information about, e.g., roads, connectivity, turn restrictions, points of interest, demographics. On-line web pages 104 provide a wealth of information for geographic features around the world, and can be used to quickly enhance the information from the commercial database 102. The users 106 may provide information about geographic features located in remote places that are not covered by the commercial databases 102 or web pages 104. The users 106 may provide information about lesser-known aspects of commonly-known geographic features. The instruments 120 may automatically measure properties of geographic features and provide periodically updated information about the properties.

The system 100 includes a content aggregator 108 and a ranking engine 110. The content aggregator 108 filters and merges information from the commercial database 102, the on-line web pages 104, and information provided by users 106, instruments 120 and any other sources to generate a geographic information database 112 that includes aggregated geographic information. The database 112 includes entries 118, in which each entry 118 in the database 112 can be associated with a geographic feature, e.g., a country, a city, a road, a building, etc.

The database 112 can employ various data structures. For example, there can be hierarchies of entries 118. One entry may be the parent of several child entries. For example, the geographic feature (e.g., a country) associated with an entry 118 may encompass the geographic features (e.g., cities) associated with other entries 118. Entries 118 can have different formats, e.g., documents, links, etc.

The content aggregator 108 may generate an entry 118 for a geographic feature by combining information from sources 102, 104, 106, and 120 and removing duplicate information. The content aggregator 108 may aggregate the content automatically. The content aggregator 108 may also provide a user interface that allows a system operator to review and edit the information provided by the sources 102, 104, 106, and 120.

The ranking engine 110 generates a rank score (or rank signal) 122 for each entry 118 in the database 112 using a variety of formulas described below. The rank scores 122 can be generated based on one or more properties of the geographic features without reference to additional data, so the rank scores 122 can be generated in real time, e.g., within a short period of time after receiving the information from sources 102, 104, 106, and 120. In some implementations, the rank scores 122 are generated without waiting for additional documents or web pages to be processed (e.g., other documents or web pages are not relevant to the ranking of an entry 118 in the database 112).

In this description, because each entry 118 is associated with a geographic feature, the phrase "ranking of the geographic feature" will also refer to ranking of an entry 118 associated with the geographic feature. The phrase "rank score of a geographic feature" will also refer to the rank score 122 of an entry 118 associated with the geographic feature. The rank score 122 for a entry 118 for a geographical feature provides an indication of the importance or usefulness of the entry 118 and the information associated with the entry 118, where the information may be in the format of a document, e.g., a text file, an HTML page, a set of numerical data, a record, a table, an image, an audio recording, a video, etc.

The rank scores 122 can be provided to applications 113, such as a search engine 114 and a map server 116. The search engine 114 can use the rank scores 122 to improve the search results in response to queries for information about geographic features. The search engine 114 may search a database 115 to find results in response to queries. The rank scores 122 can be used in combination with other ranking measures, e.g., those based on inferred opinion and content. For example, when a user types in the keyword "Cambridge" to query a search engine, the search results may include pages about Cambridge city in England, Cambridge city in Ontario, Canada, Cambridge city in Indiana, Cambridge city in Maryland, Cambridge city in Massachusetts, Cambridge city in Minnesota, Cambridge city in Nebraska, and Cambridge city in Ohio. It may be useful to rank the search results based on properties of the various Cambridge cities in additional to other ranking measures based on inferred opinion and content.

The map server 116 can use the rank scores 122 to generate maps having geographic features. The map server 116 may access a map database 117 that includes information (e.g., satellite images and coordinates of geographic features) useful for rendering maps. The map server 116 can use the rank scores 122 to determine which geographic features to show on the map for a given map scale. Some of the properties of the geographic features may provide indications of the usefulness of the geographic features to users, so the map server 116 can populate the map with geographic features that are more important to users.

For example, two roads (road A and road B) may have the same classification (e.g., both are state roads) and the same width. In conventional maps, the two roads may be treated similarly, i.e., both roads may either be displayed or not displayed, depending on map scale. However, road A may be more important (or useful) than road B because, e.g., the population density along road A may be higher, road A may be linked to other more important roads, or more businesses are located along road A. In this example, using rank scores 122 generated by a process that takes into account the population density along roads, number and importance of businesses along the roads, and the networking of roads, the map server 116 may display road A but not road B. This feature is useful in displaying maps to show important features and not clutter the maps with less important features. This feature is also useful when generating maps for display on small screens.

The rank scores can also be provided to applications that provide direction and navigation services (e.g., a route planning module). For example, the rank scores can be useful in determining preferred roads and landmarks to navigate by when planning routes to user-selected destinations. The navigation application may determine several possible routes that pass through user-selected locations, and select one of the routes based on the rank scores of geographic features of the routes.

As discussed above, the rank scores of the geographic features can be generated in real time. Thus, applications (e.g., the search engine 114, the map server 116, and the route planning module) can receive rank scores 122 that are determined in real time based on up-to-date geographic information. For example, the rank engine 110 can update rank scores on-the-fly each time that the rank scores are requested by an application. The rank engine 100 can also update the rank scores continuously as new geographic information is received, and provide the updated rank scores to the applications. For example, indices of databases used by the applications can be continuously updated based on the updated rank scores. The search engine 114 can continuously update the sequence of search results according to the most current rank scores. The map server 116 can continuously update a map to show features based on the most current rank scores. The route planning module can continuously update navigation information based on the most current rank scores, which in turn are determined based on the most current information received by the ranking system 100.

2. Ranking of Geographic Features

The ranking engine 110 may use several factors or attributes of the geographic features to generate the rank scores 122. Different factors may be used for ranking different types of geographic features. For example, the factors that may be important in ranking cities may be different from the factors that are important for ranking railroads. The description below provides examples of factors that can be considered in generating rank scores 122 for various types of geographic features. The examples are not exhaustive. Other factors not listed herein may also be considered.

2.1. Area Based Ranking

In some examples, the rank score 122 of a geographic feature can be based on an area of the feature. This will be referred to as the "area rank". The rank score 122 can be based on a relationship between the area of the geographic feature and the area of the entire land mass or water mass on the planet Earth. For example, assume the area of the feature is Af and area of the planet is Ap, in which the area of the total land mass (above water level) of the planet is Am and the area of the total water mass on the planet is (Ap−Am). One method of generating rank scores 122 of the geographic features is by using the equations:

$$\text{Rank(feature)}=\log(Af+e)/\log(Am), \text{ if the feature occupies land mass,} \quad \text{(Equ. 1)}$$

$$\text{Rank(feature)}=\log(Af+e)/\log(A-Am), \text{ if the feature occupies water mass,} \quad \text{(Equ. 2)}$$

where e is a small number to keep Af+e>1. Other ranking schemes may be derived by varying the functions (e.g., changing the log function to other functions) or constants in the above equations.

A geographic feature may have several properties related to area that can be used to generate the rank score. For example, the rank score of a city may be based on the size of residential area and the size of business district, so that two cities having the same overall size but having different business to residential area ratios may be ranked differently. Attributes related to area may include, e.g., the area of parks with a city, the area of farm land within a region, and the area above a certain altitude, etc.

The rank scores 122 that are generated based on areas provide indications of the potential utility to users by taking into account the value of the land and water masses of the features.

2.2. Density Based Ranking

A number of enhancements can be made to the area rank. For example, the population density of the geographic feature can be used to enhance the rank score 122:

$$Ia=\int \rho(x,y)\cdot dA,$$

where ρ represents the population density with some minimum constant denoting basic land or water utility, and A represents area. Ia can be used to enhance or replace Af in Equations. 1 and 2.

Similar to population density, other economic density or existence factors (e.g., of fixed and measurable resources) can be used to improve ranking. These factors include degree of urbanization, income distribution function, quality of land functions (e.g., fertile soil or desert), infrastructure density (e.g. road density, speeds, etc.), livability, safety or crime-free degree, water, or weather. Infrastructure density can include, e.g., the percentage of arable land, and the percentage of land reachable by vehicles. If the geographic feature is a building, the infrastructure density can also include the total built up area of the building or the number of floors of the building.

2.3. Aggregate Based Ranking

An aggregate approach can also be used to generate the rank scores 122. For example, the ranking may take into account the total population, the total length of roads, the total number of households having high speed Internet connection, the total number of houses or stores, the regional weather, the total number of crimes over a given period of time, etc.

2.4. Visual Prominence

The visual prominence of a feature can also be a factor to be considered in the ranking. A geographic feature that is more visible may have a higher rank score, as compared to another feature that is less visible, other factors being equal. Visual prominence can be assigned to features based on a scale (e.g., 0 to 1.0).

2.5. Transportation Network Ranking

The following describes factors that can be considered when generating rank scores 122 for geographic features related to transportation networks (hereinafter referred to as transportation features). A transportation feature can include, e.g., roads, railways, ferry ways, air ways, and other natural or man made pathways. A transportation feature may have one or more properties based on size and other features. For example, factors to consider for ranking transportation features can include the total length of the transportation feature, such as the total length of the road, railway, or bike way. A transportation feature having a longer length may be ranked higher than another similar feature having a shorter length, other factors being the same.

Factors that can be considered when ranking transportation features may include the measurable quality of the transportation feature, e.g., the number of lanes, the road width, the type of paving, the type of infrastructure (such as whether the feature is a highway, a side road, or an arterial road, etc.), capacity attributes (e.g., the maximum speed allowed), and the usage of the feature. The usage of the feature may include, e.g., the total number of people carried per day or per year, or the total number of people carried from a reference time point to the time that the rank score 122 is generated.

Factors that can be considered when ranking transportation features may include the degree of networking of the transportation feature. This includes the number of intersections with other roads and the degree of access to the general public. For example, a road that is directly linked to a major highway may be ranked higher than a road that is far away from any highway, other factors being equal.

For example, a ranking function for a road can be:

$$\begin{aligned}\text{Rank(feature)}=&[\log(\text{length}/\text{MaxLength})+\\&k\text{Lanes}*n\text{Lanes}+Fs(\text{surface quality})+\log(\text{speed}/\\&\text{MaxSpeed})+Fa(\text{access type})+\log(fs\text{um(intersection\_prominence)}/\text{MaxIntersections})]/\log\\&(\text{MaxSignal}),\end{aligned} \quad \text{(Equ. 3)}$$

in which the variables are defined as follows:
length: the length of the road;
kLanes: a Lane constant;
nLanes: the number of lanes of the road;
Fs: a function that increases as the quality of the surface of the road increases (e.g., from 0.0 for dirt to 1.0 for concrete);
speed: the speed allowed or the typical speed on this road;

MaxSpeed: the maximum expected speed for this type of road;

Fa: a value that increases as the road becomes more public and accepted;

intersection_prominence: a function that reflects complexity and prominence of an intersection (e.g., a large circle versus a 4-way stop versus a 4-way light versus a graded flyover of this road over another road);

fsum: sum of intersections, or sum modulo of some maximum number of intersections per unit length, or other such monotonically increasing function;

MaxIntersections: a constant to keep the ratio (fsum(intersection_prominence)/MaxIntersections) less than a predefined constant;

MaxSignal: a variable used to normalize the rank score to be close to the range of other types of rank scores.

Similar functions can be defined for railways, ferry ways, water ways, and air ways.

2.6. Network Based Ranking

The rank score 122 of a geographic feature can be influenced by other geographic features associated with the feature under consideration. For example, the rank score 122 of a particular road may be enhanced if the roads that intersect the particular road have higher rank scores 122 than typical roads.

Another approach is to enhance or diminish the rank of a region based on the number of a quality features inside the region (containment ranking). For example, the rank score of a state is influenced by the rank scores of, e.g., cites and transportation networks in that state.

A geographic feature that is itself unimportant (e.g., would otherwise have a low ranking) may nonetheless be important (e.g., have its ranking increased) if it is associated with other important geographic features. For example, the rank score 122 of a rest stop (or a small town) may depend on whether the rest stop is located in a remote area along a small road, located near an exit or a termination point of a major highway, or located beside a major highway but far from any highway exits. A rest stop A located near an exit of a major highway may have a higher rank score 122 than a rest stop B located near and connected to the major highway but away from any highway exit, which in turn may have a higher rank score 122 than a rest stop C located in a remote area beside a small road.

The rank score 122 of a geographic feature may depend on the relationship of the feature with other features. For example, a rest stop D may be situated along a road where the nearest rest stop is a hundred miles away, while a rest stop E may be located along the road where the nearest rest stop is only 10 miles away. The rest stop D may have a higher rank score 122 than the rest stop E because of the importance of the rest stop D to travelers.

For example, the rank score of a road may influence the rank scores of other geographical features that are associated with the road. Points of interests and listings along a first road having a higher rank score may have higher rank scores than similar points of interests and listings along a second road having a lower rank score. For example, the rank score 122 of a beach or park may depend on whether the beach or park is located within or near a major city.

A ranking function may take into account whether a geographic feature is compatible with other geographic features. For example, a small feature near a fast freeway can be less valuable than a small feature on a busy market.

Visibility of the geographic feature to the general population may be considered in determining the rank score 122. The visual prominence (e.g., height of a building and width of a river) may affect visibility. Proximity to a major access feature like a highway or a busy port (especially if the feature is tall or wide) may increase the visibility of the feature (e.g., because more people will be able to see the feature), and therefore increase the rank score 122 of the feature. The function for generating a rank score 122 based on visual prominence may not be monotonic with feature size.

Rank scores may propagate through networks of geographic features. The rank score of a geographic feature may indirectly influence rank scores of remote geographic features. For example, a first local road connected to an important highway may have a higher score than a second local road of a similar type and width. Points of interests and listings (e.g., businesses) along the first local road may also have higher rank scores than similar points of interests and listings along the second local road, even though the first local road by itself may have the same rank score as the second local road. The rank scores of points of interests and listings along the first local road are boosted by the highway even though the points of interests and listings may not be directly connected to or be located near the highway.

Similarly, the rank score of a major metropolitan area may propagate to and influence the rank scores of satellite cities that provide supplies and services to the metropolitan area, suburban areas whose residents commute to the metropolitan area for work, and other geographic regions that are linked to the metropolitan area through various transportation networks. Satellite towns surrounding major cities may have higher rank scores than towns that are otherwise similar but not associated with any major city. A suburban region that is connected to a major city through a convenient transportation system (e.g., subway, train, or highway) may have a higher rank score than another suburban region that is otherwise similar but without convenient access to the major city.

Geographic features linked to or associated with other important geographic features will be considered important and have higher rank scores. Geographic features may mutually influence the rank scores of one another. Rank scores may "feed back" on itself through networks of geographic features. For example, a road having a high rank score may boost the rank scores of points of interests and listings along the road. The rank scores of the points of interests and listings in turn may also boost the rank score of the road.

2.7. Ranking Based on Purpose

Some or all of the factors described above can be used for query or context dependent ranking. Different rank scores 122 can be generated for different purposes. Factors that are considered to be important for one purpose may be less important for other purposes.

For example, the factors that are considered to be important for deciding whether to purchase a real estate property may be different from the factors for deciding whether a real estate property is worth visiting during a vacation. Thus, the rank score 122 of a geographic feature may be different depending on whether the rank score 122 is used in response to, e.g., a query for tourism, a query for a place to live, or a query for a place to purchase. Accordingly, a single geographic feature (e.g., an entry 118) can have a plurality of rank scores 122 associated therewith, one for each context, where a given rank score 122 is derived/identified after a context based evaluation is performed as will be discussed in greater detail below. The geographic feature can also have a generic rank score 122 that is not associated with any purpose or context.

2.8. Incremental Update of Ranking

When an entry 118 for a geographic feature is modified, the rank score 122 for that feature can be modified incrementally without having to re-compute the complete rank score 122. The rank score 122 of a geographic feature may also be modified incrementally when entries for other associated features are modified. This allows a rank score to be updated quickly even if the rank score is determined based on a complex ranking function that is dependent on many variables.

For example, a geographic feature may include a complex road network with thousands of road segments. The rank score 122 of the complex road network may include several components, so that if a portion of the road network (e.g., a road segment) is modified, only one or a few of the components need to be revised without requiring the entire rank score 122 to the re-computed. Similarly, the ranking of a city may take into account thousands of factors. By modularizing the computation of the rank score 122 of the city, small changes in the city (e.g., buildings being erected or roads being added) may require only a small amount of computation to update the overall rank score 122 of the city.

For example, if a road section is newly added to a long road feature, the rank score of the road feature including the new road section can be determined as follows:

$$\text{Rank(road feature)\_new} = \log(e^{\text{Rank(road feature)\_old}} + \text{Rank(road section added)}) \quad \text{(Equ. 4)}$$

When updating the scores of one or a few components of a complex geographic feature, the rank function of the geographic feature can be unraveled using reverse functions. For example, the exponential function can be used for the log function and then multiplied by a constant divisor. As another example, the old rank score 122 of a modified sub-feature (e.g., road segment or intersection) can be subtracted from the overall rank score 122 and the new rank score 122 of the modified sub-feature can be added to the overall rank score 122. This method can also be used when the rank scores 122 of associated features are modified.

2.9. Confidence Scores

The rank score 122 of an entry 118 may be modulated based on, for example, the reliability and accuracy of the source of the geographic information used for the entry 118. A confidence score can be assigned to each source of geographic information. Some commercial databases 102 may be more accurate and given more weight than other databases 102. Some users 106 may be more reliable and given more weight than other users 106. Thus, the confidence scores of the sources of information may be taken into account when generating the rank scores 122.

The system 100 may maintain a database 124 having confidence scores 126 of various sources of geographic information. For example, the database 124 may include a record 128 for each user 106 who has submitted geographic information, in which the record 128 includes a confidence score 126 associated with the user 106. A user 106 with little past history may be initially given a low confidence score 126. The system 100 may increase the confidence score 126 of the user 106 if the information submitted by the user 106 is verified to be accurate. The confidence score 126 of the user 106 may increase if other users 106 approve the information. The confidence score 126 of the user 106 may increase further as he or she repeatedly submits information that is verified to be accurate.

The confidence score 126 of a user 106 may decrease if the user 106 submits information about a geographic feature that is inconsistent with other geographic features, such as when the user 106 submits information indicating that a building is at a location where other reliable sources indicate that there is a lake.

Suppose a geographic feature A includes geographic features B and C, and the rank score 122 of feature A is a function of the rank scores 122 of features B and C. The confidence score 126 of the user 106 who provided information about feature B can be used to limit the maximum rank score 122 of feature B in computing the rank score 122 of feature A. When the confidence score 126 of the user 106 who provided information about feature B increases above a certain threshold, the limitation on the rank score 122 of feature B can be removed.

Similarly, the system 100 may keep a record 128 for each instrument 120 used to collect geographic information. The record 128 can include a confidence score 126 indicating the reliability and accuracy of the measurements made by the instrument 120. The rank score 122 of a geographic feature derived based on information provided by a particular instrument 120 can be modulated by the confidence score 126 of the instrument 120.

The confidence scores 126 may be assigned and updated by a human operator. The confidence scores 126 may also be assigned or updated automatically based on predetermined criteria, such as the ones described above.

2.10. Ranking Based on Economic Development

In some examples, the rank score 122 of a geographic feature can be based on a degree of economic development of the feature. For example, a city that is more developed may have a higher score than another city that is less developed. The degree of development can be measured using a number of factors, such as the length and quality of railway and roads, the length of telephone lines and power lines, the number of schools, the number of households with high speed Internet connection, median income, median house price factored with purchase price parity, number of schools, doctors per thousand people, etc.

2.11. Ranking Based on Biodiversity

In some examples, the rank score 122 of a geographic feature can be based on a degree of biodiversity. For example, a forest or swamp having a larger variety of animal or plant species may have a higher rank score (or lower rank score, depending on context) than another forest or swamp having a smaller number of different species of animals or plants.

3. Process for Generating Rank Scores

Figure 2:
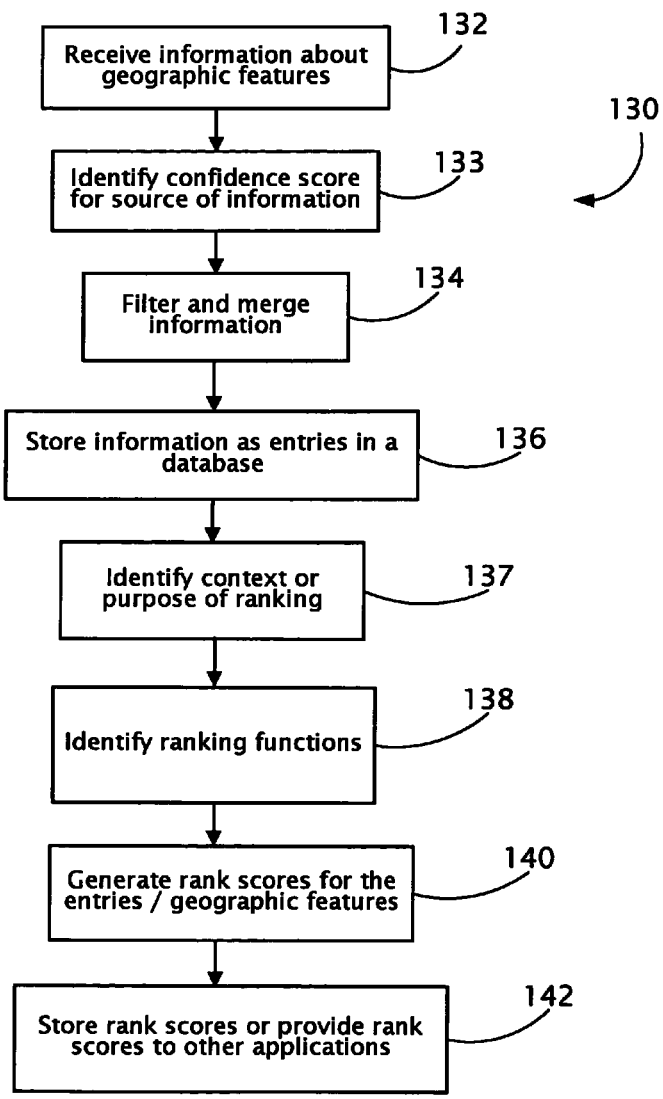
FIG. 2 is a flow diagram of a process for ranking geographic information.

FIG. 2 is a flow diagram of an example of a process 130 for ranking geographic information. Initially, pieces of information about a geographic feature are received 132 from a number of sources. The confidence scores for the sources are identified 133. The pieces of information are filtered and merged 134. The merged information associated with a geographic feature is stored 136 as entries in a database. One or more contexts or purposes are identified 137. For each purpose, a ranking function for generating rank scores 122 for the geographic features are identified 138. Identifying the ranking function includes identifying the parameters used to generate the rank scores 122. Rank scores 122 are generated 140 for the entries or geographic features using the identified ranking functions, taking into account the confidence scores of the sources. The rank scores 122 are stored 142 in a database or provided to other applications.

One of more steps of process 130 can be optional. For example, identifying confidence score and using confidence scores in generating the rank scores can be optional.

For example, the process 130 can be implemented by the system 100. The pieces of information can be received from sources such as 102, 104, 106, and 120. The pieces of information can be filtered and merged by, e.g., the content aggregator 108. The merged information can be stored as entries 118 in, e.g., the geographic information database 112. The ranking engine 110 identifies the ranking function based on the type of geographic feature being ranked, and determines which combination of ranking schemes (e.g., area based ranking, density based ranking, aggregate based ranking, visual prominence ranking, transportation network ranking, and network based ranking) are used to generate the rank scores 122.

The rank scores 122 can be provided to, e.g., the search engines 114 or the map servers 116. The rank scores 122 can be entered into a database accessible to other applications. The ranking engine 110 may update the rank scores 122 in the database from time to time when additional pieces of information are received from the sources.

Figure 3:
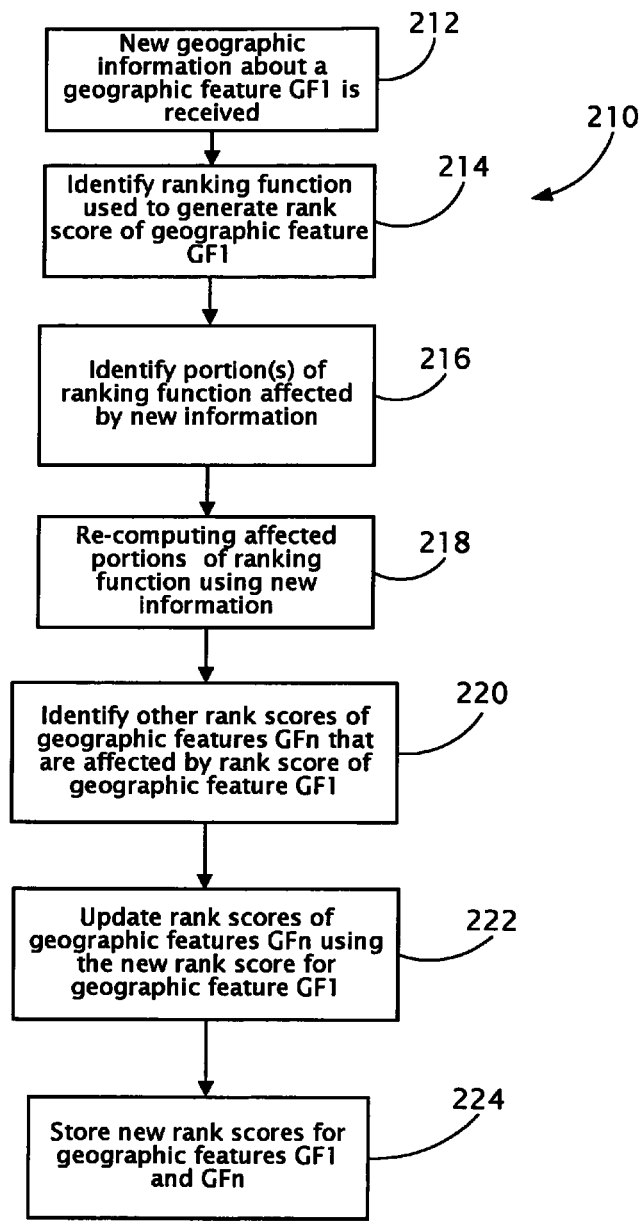
FIG. 3 is a flow diagram of a process for updating rank scores.

FIG. 3 is a flow diagram of an example of a process 210 for updating rank scores 122. One or more new pieces of information about a geographic feature GF1 is received 212. The ranking function used to rank the geographic feature GF1 is identified 214. The portions (or parameters) of the ranking function that are affected by the new pieces of information are identified 216. The rank score 122 of geographic feature GF1 is updated by re-computing 218 the affected portions of the ranking function using the new pieces of information.

The updated rank score 122 of GF1 is propagated to other geographic features. Other geographic features GFn whose rank scores 122 depend on the rank score 122 of geographic feature GF1 are identified 220. The rank scores 122 of geographic features GFn are updated 222 using the new rank score 122 for geographic feature GF1. The updated rank scores 122 for geographic features GF1 and GFn are stored 224.

In some examples, the new rank score of geographic feature GF1 is propagated to other geographic features that depend on the rank score of the geographic feature GF1 using an iterative algorithm that converges rapidly. For example, the feature GF1 may depend on one or more of geographic features GF2 to GFn. When the rank scores of GF2 to GFn are updated, the rank score of GF1 is updated again, and so forth. The iterative algorithm can be similar to those for calculating PageRank, as described in "The Antaomy of a Large-Scale Hypertextual Web Search Engine," by Sergey Brin and Lawrence Page, Computer Networks and ISDN Systems, 33: 107-17, 1998, herein incorporated by reference.

For example, the rank score of a business building may depend on the rank score of nearby subway—the rank score of the building may be higher may be higher if the subway passes through major locations or is connected to major transportation networks. The rank score of the subway may also depend on the rank score of the business building—the rank score of the subway may be higher if it has a stop near a major business building. When the rank score of the subway increases, perhaps due to recent renovation, the rank scores of the business building and the subway are iteratively updated until the rank scores converge.

For example, the process 210 may be implemented by the ranking engine 110. For example, the ranking engine 110 may receive information from sources (e.g., 102, 104, 106, and 120) about a road R that has recently been extended and businesses that have recently established along the road R. The ranking engine 100 updates the rank score 122 for the road R by re-computing the portions of the ranking function related to the extension of the road and establishment of businesses along the road. The ranking engine 110 then identifies other geographic features, e.g., cities, countries, beaches, buildings, other intersecting roads, that are affected by the road extension and establishment of businesses along road R. The ranking engine 110 identifies the ranking functions for the other geographic features, identifies the portions of the ranking functions that are affected by the rank score 122 of road R, and updates those ranking functions by re-computing the portions using the new rank score 122 of road R.

Figure 4:
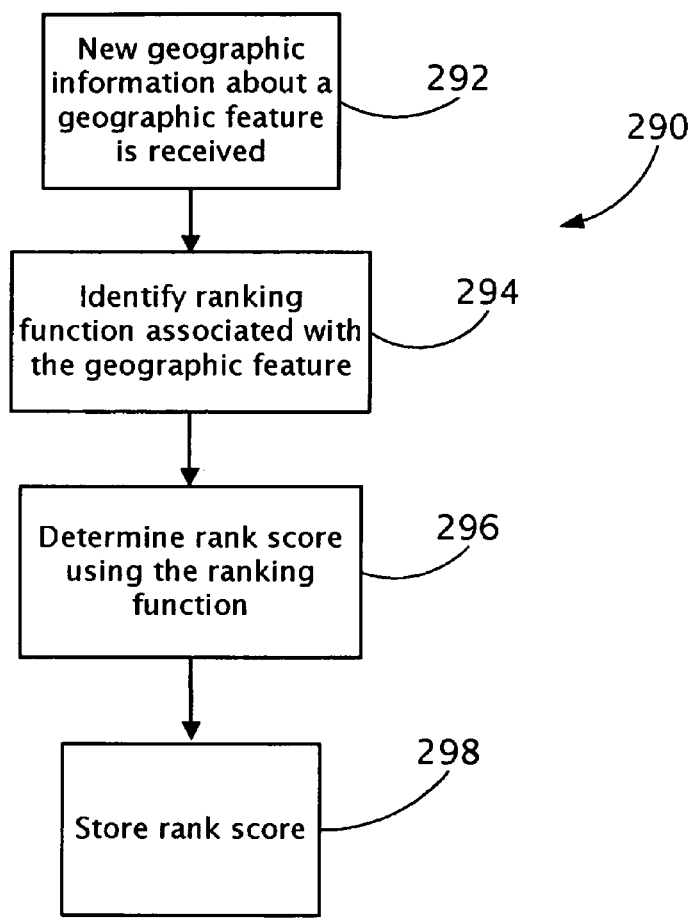
FIG. 4 is a flow diagram of a process for generating rank scores based on the ranking function for a geographic feature.

FIG. 4 is a flow diagram of an example of a process 290 for generating rank scores based on the ranking function for a geographic feature. In the process 290, a piece of information related to a geographic feature is received 292. A ranking function for ranking the geographic feature is identified 294. The rank score of the geographic feature is determined 296 using the identified ranking function. The rank score is stored 298 in a database.

The ranking function can be based on various factors, such as the area, the density attributes, and the aggregate attributes of the geographic feature, properties of transportation networks, and relations between geographic features. Processes for generating rank scores based on different ranking functions are described below.

Figure 5:
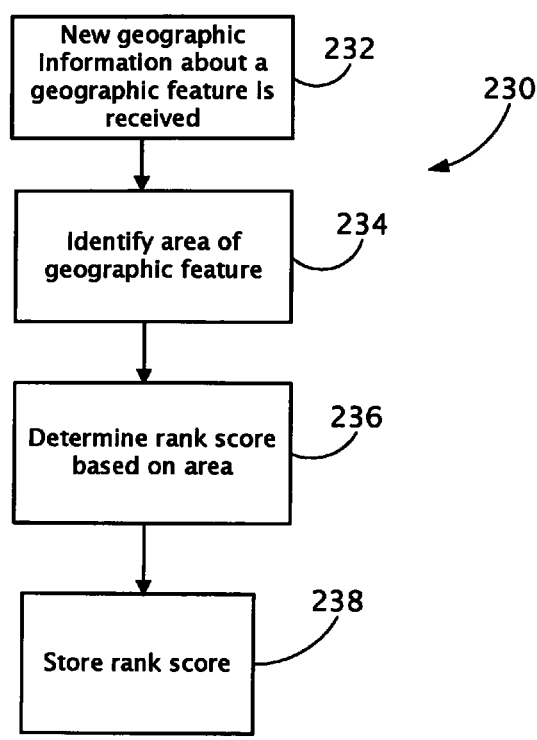
FIG. 5 is a flow diagram of a process for generating rank scores based on the area of a geographic feature.

FIG. 5 is a flow diagram of an example of a process 230 for generating rank scores based on the area of a geographic feature. In the process 230, a piece of information related to a geographic feature is received 232. The area of the geographic feature is identified 234. The rank score of the geographic feature is determined 236 using a ranking function based on the area of the geographic feature. The rank score is stored 238 in a database.

Figure 6:
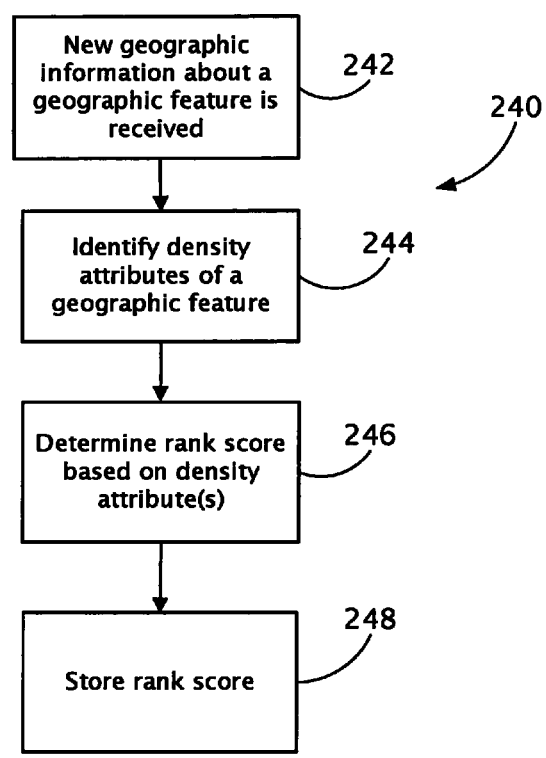
FIG. 6 is a flow diagram of a process for generating rank scores based on density attributes of a geographic feature.

FIG. 6 is a flow diagram of an example of a process 240 for generating rank scores based on density attributes of a geographic feature. The density attributes include, e.g., population density. In the process 240, a piece of information related to a geographic feature is received 242. The density attributes of the geographic feature are identified 244. The rank score of the geographic feature is determined 246 using a ranking function based on the density attribute(s) of the geographic feature. The rank score is stored 248 in a database.

Figure 7:
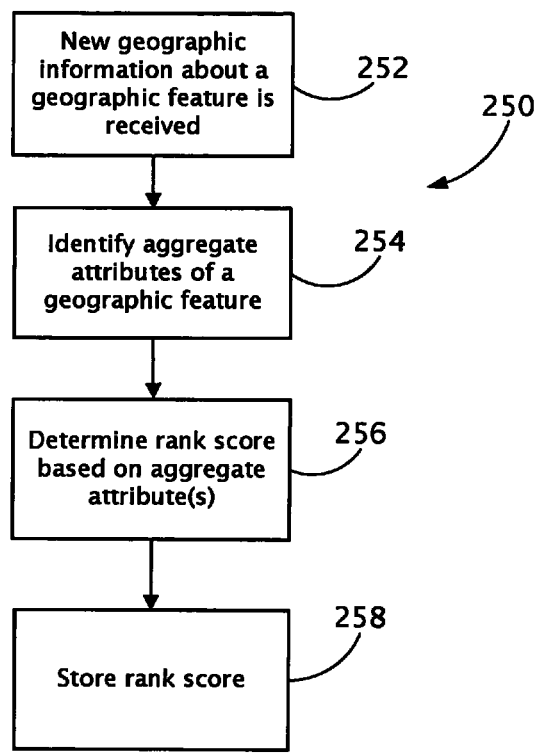
FIG. 7 is a flow diagram of a process for generating rank scores based on aggregate attributes of a geographic feature.

FIG. 7 is a flow diagram of an example of a process 250 for generating rank scores based on aggregate attributes of a geographic feature. The aggregate attributes include, e.g., total income or trade. In the process 250, a piece of information related to a geographic feature is received 252. The aggregate attributes of the geographic feature are identified 254. The rank score of the geographic feature is determined 256 using a ranking function based on the aggregate attributes of the geographic feature. The rank score is stored 258 in a database.

Figure 8:
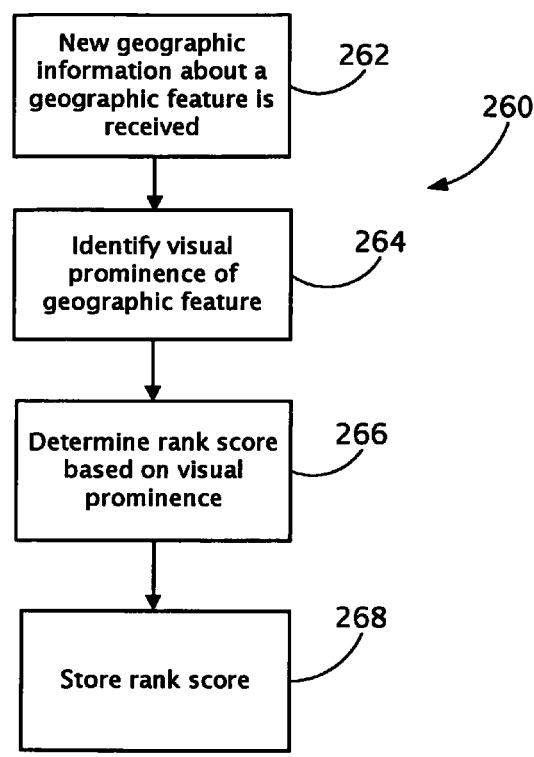
FIG. 8 is a flow diagram of a process for generating rank scores based on the visual prominence of a geographic feature.

FIG. 8 is a flow diagram of an example of a process 260 for generating rank scores based on the visual prominence of a geographic feature. In process 260, a piece of information related to a geographic feature is received 262. The visual prominence of the geographic feature is identified 264. The rank score of the geographic feature is determined 266 using a ranking function based on the visual prominence of the geographic feature. The rank score is stored 268 in a database.

Figure 9:
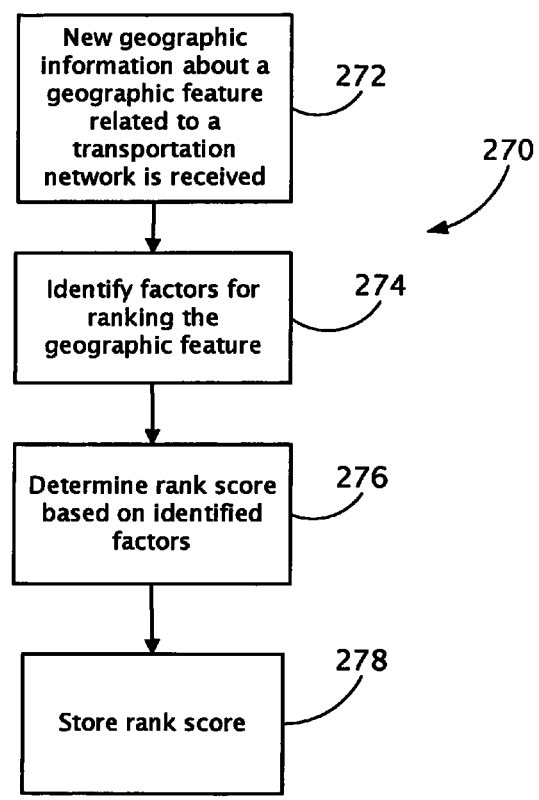
FIG. 9 is a flow diagram of a process for generating rank scores for a geographic feature related to a transportation network.

FIG. 9 is a flow diagram of an example of a process 270 for generating rank scores for a geographic feature related to a transportation network. In process 270, a piece of information related to a transportation network is received 272. The factors to consider when ranking the transportation network are identified 274. The factors may include, e.g., the total length of the transportation feature and the degree of networking of the transportation feature, etc. The rank score of the geographic feature is determined 276 using a ranking function based on the identified factors. The rank score is stored 278 in a database.

Figure 10:
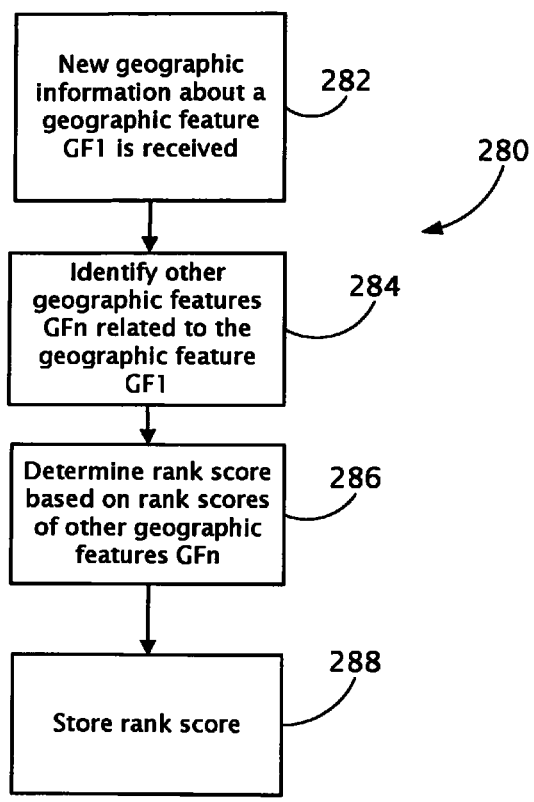
FIG. 10 is a flow diagram of a process for generating a rank score for a geographic feature based on the relation between the geographic feature and other geographic features.

FIG. 10 is a flow diagram of an example of a process 280 for generating a rank score for a geographic feature based on the relation between the geographic feature and other geographic features. In process 280, a piece of information related to a geographic feature GF1 is received 282. Other geographic features GFn related to the geographic feature GF1 are identified 284. The rank score of the geographic feature GF1 is determined 286 using a ranking function based on the rank scores of the other geographic features GFn or the relationship between the geographic feature GF1 and the other geographic features GFn. The rank score is stored 288 in a database.

4. Applications of Rank Scores

Search results for geographic information can be ordered based on the rank scores described above, including the use of context dependent rank scores. Similarly, the rank scores can be used to improve rendering of maps by prioritizing higher ranked features to select which features are shown in a map at a given zoom level and at a specified prominence level. Also, when generating directions or navigating the user to a destination, roads to use can be selected based on the rank scores of the roads and/or road sections, and landmarks to show in the directions. Navigation screens can also be selected based on the ranking signals. In addition, depending on the user's intent and desire, the ranking of geographic information can be altered to suit the usage (e.g. scenic route versus fastest route).

The ability to incrementally update the rank scores (or ranking signals) in real-time allows the results of the applications (e.g., searching, map rendering, navigation) to be modified constantly as geographic information in a repository (e.g., database 112) evolves.

Figure 11:
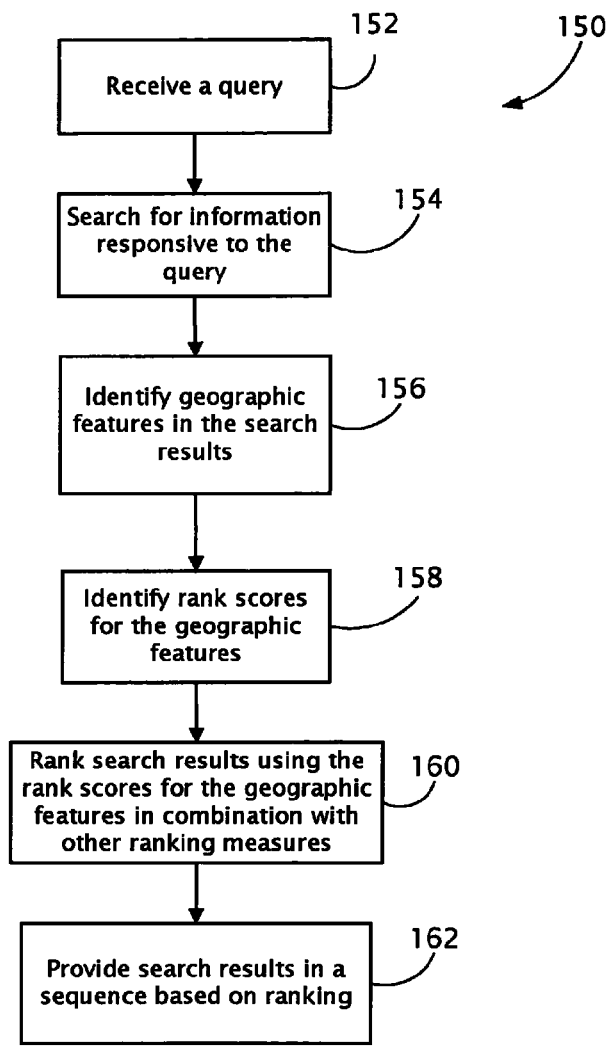
FIG. 11 is a flow diagram of a process for responding to queries using rank scores of geographic features.

FIG. 11 is a flow diagram of an example of a process 150 for responding to queries using rank scores 122 of geographic features. A query is received 152. Based on the query, a search 154 is performed to identify results, e.g., documents and links, that are responsive to the query. The search results are evaluated to identify 156, if any, geographic features in the search results. Rank scores 122 for the geographic features are identified 158. The search results are ranked 160 based on the rank scores 122 for the geographic features in combination with other ranking measures. The search results are returned 162 in a sequence according to the ranking.

For example, the query may be received by the search engine 114. The searching 154 and identifying 156 can be performed by the search engine 114. The search results may be documents (e.g., links or web pages) previously stored in the search database 115. In some examples, the search engine 114 queries the ranking engine 110 to generate the rank scores 122 of the identified geographic features. In some examples, the search engine 114 looks up the database 112 to identify the rank scores 122 in the entries 118 associated with the various identified geographic features. The search engine 114 ranks the search results based on the rank scores 122 in combination with other ranking measures, and returns a list of search results in a sequence according to the ranking.

For example, a web user may perform a keyword search and send a query to the search engine 114 with the keyword "Cambridge." The search engine 114 may search the database 115 and find various web pages or documents having the keyword "Cambridge." The search engine 114 may identify which of those web pages and documents are associated with geographic entities related to "Cambridge," such as cities, towns, schools, and buildings around the world that have "Cambridge" in their names. The search engine 114 may communicate with the ranking engine 110 or lookup the database 112 to determine the rank scores 122 of the geographic entities, and use the rank scores 122 in combination with other ranking measures, e.g., inferred opinion or content, to rank the web pages and documents having the keyword "Cambridge." The search engine 114 then returns a list of links pointing to the web pages and documents in a sequence according to the overall ranking of the web pages and documents.

Figure 12:
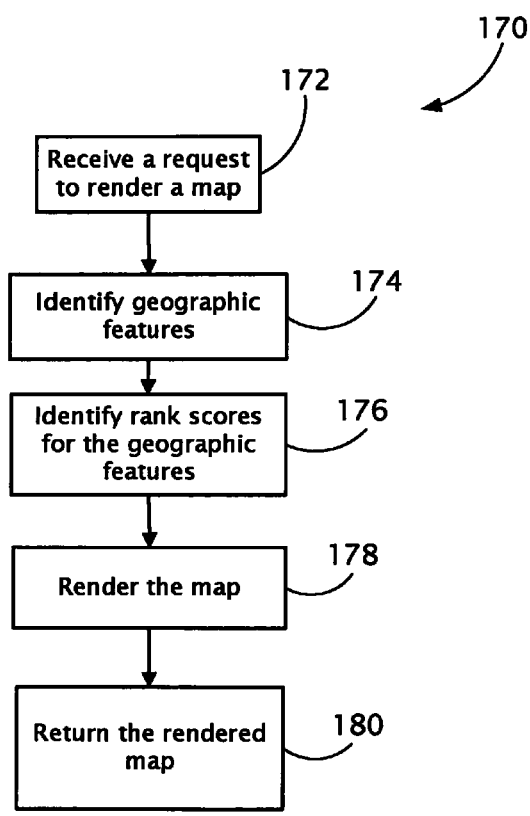
FIG. 12 is a flow diagram of a process for rendering maps using rank scores of geographic features.

FIG. 12 is a flow diagram of an example of a process 170 for rendering maps using rank scores 122 of geographic features. A request for rendering a map of a particular geographical region using a certain map scale is received 172. Geographic features that are located within the requested geographical region are identified 174. The rank scores 122 of the identified geographic features are identified 176. A map is rendered 178, in which the map includes geographic features having rank scores 122 above a threshold. The rendered map is returned 180.

For example, the request for rendering a map may be received by the map server 116. The map server 116 may search the map database 117 to identify the geographic features within the requested geographical region. The map server 116 may communicate with the ranking engine 110 or lookup the database 112 to determine the rank scores 122 of the identified geographic features. The map server 116 may then render the map and return the rendered map.

Figure 13:
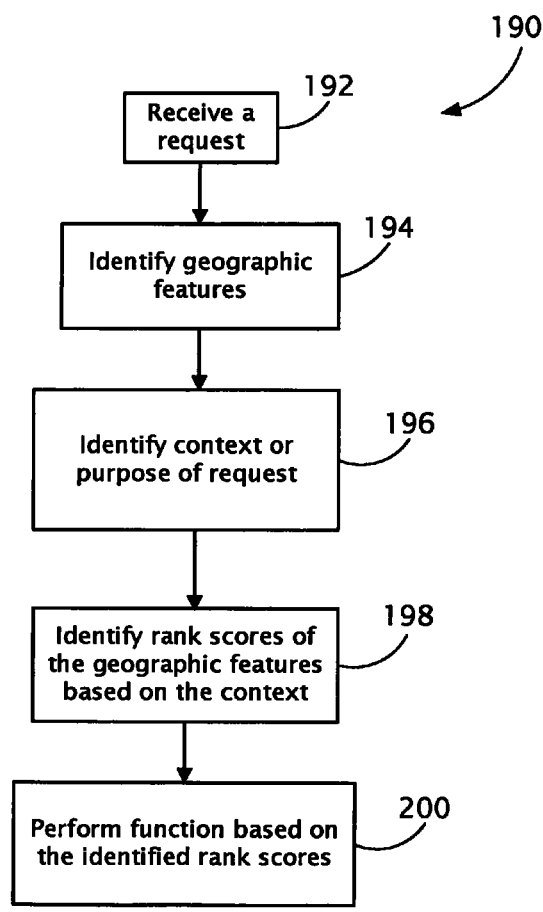
FIG. 13 is a flow diagram of a process for ranking geographic features based on context or purpose.

FIG. 13 is a flow diagram of an example of a process 190 for ranking geographic features based on context or purpose. A request is received 192. The request can be, e.g., a keyword query or a request for a map. Based on the request, geographic features responsive to the query are identified 194. For example, if the request is a keyword query, the geographic features can be identified from the search results. If the request is for a map of a geographical region, the geographic features can be those features within the geographical region.

The context or purpose of the request is identified 196. For example, if the request is a keyword query, the key words or phrases used for the search and the search results can be evaluated to determine the context or purpose of the query. For example, if the query string includes "travel" and "New York," the purpose of "travel" is identified. If the query string includes "real estate investment" and "New York," the purpose of "real estate investment" is identified. Alternatively, options may be provided to allow a user to specify the particular context of purpose of the request.

The keyword query may be sent from other applications or web sites. For example, if the keyword query is sent from a travel web site or an application associated with a travel agency, and the key words or phrases contain geographical locations, then it can be inferred that the purpose of the keyword query is related to travel, and rank scores related to travel are identified. If the keyword query is sent from a web site related to real estate or an application associated with a real estate agency, and the key words or phrases contain geographical locations, then it can be inferred that the purpose of the keyword query is related to purchase of real estate, and rank scores related to purchase of real estate are identified.

If the context or purpose of the request can be identified, rank scores 122 for the identified geographic features and the identified context or purpose are identified 198. Certain functions are performed 200 based on the identified rank scores. For example, if the request is a keyword query, a list of search results may be returned in a sequence according to a ranking performed based on the rank scores in combination with other ranking measures. If the request is for a map, a map having geographic features with rank scores above a threshold is rendered and returned.

For example, the steps of receiving a request 192, identifying geographic features 194, and identifying context or purpose of request 196 can be performed by, e.g., the search engine 114, the map server 116, or another module. The search engine 114 (or the map server 116) may communicate with the ranking engine 110 to obtain rank scores, or may access the database 112 to obtain the rank scores 122 previously stored in the database 112. The search engine 114 (or the map server 116) may provide an application programming interface (API) that others can use to submit keyword queries or request maps. The API may accept arguments specifying the context or purpose of the request.

5. Additional Examples

Figure 14:
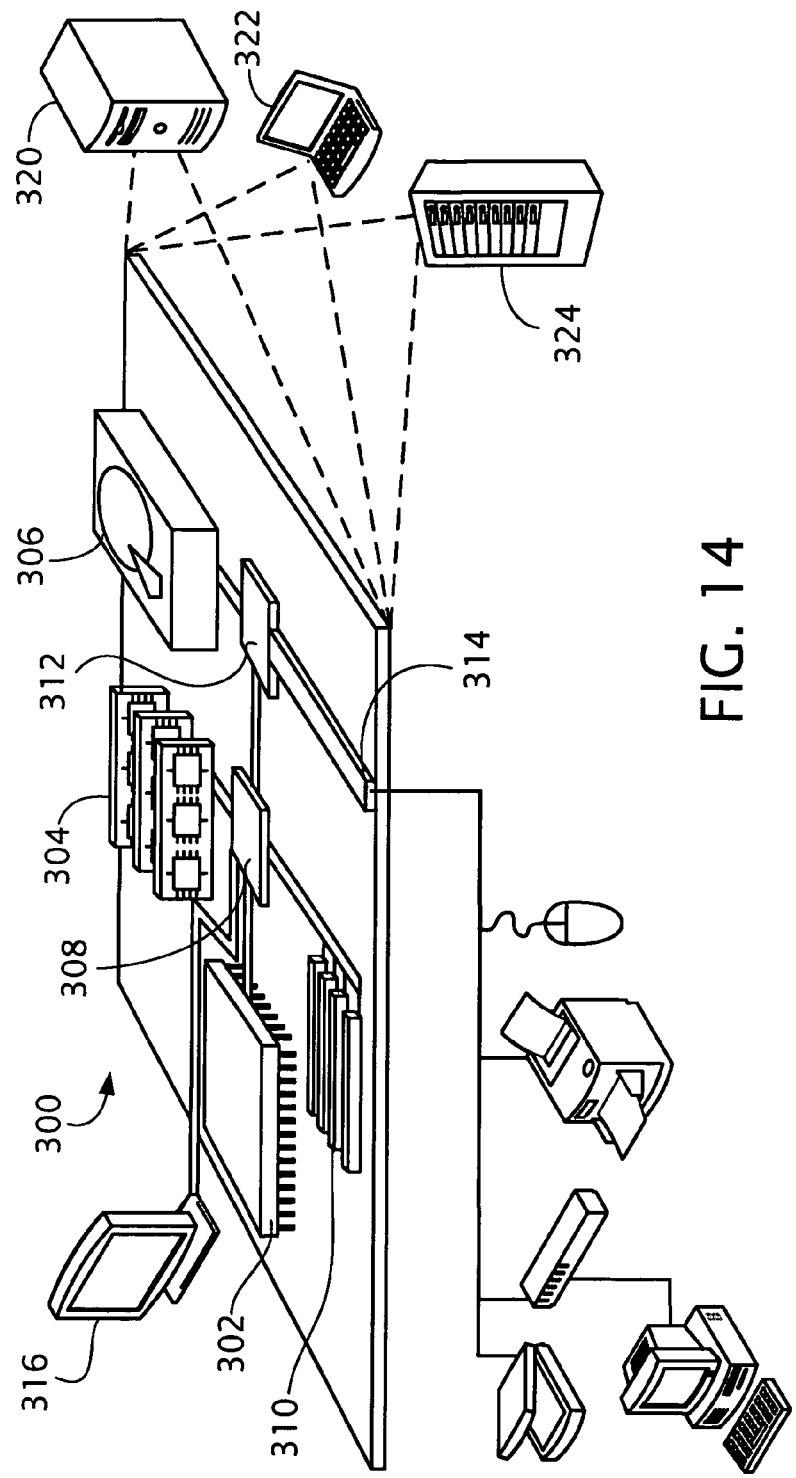
FIG. 14 is a schematic representation of a general computing system.

FIG. 14 shows a schematic representation of a general computing system 300 that can be used to implement the system 100. Computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, memory on processor 302, or a propagated signal.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Each of such devices (e.g., standard server, rack server system, personal computer, laptop computer) may contain one or more of computing device 300, and an entire system may be made up of multiple computing devices 300 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated. The geographic features can be different from those described above.

The factors to consider when generating the rank scores 122 may be different from those described above. For example, the rank score of a geographic feature may be generated based on the amount of $CO_2$ and other green house gas emissions from the feature. A city with a lower green house gas emission may have a higher rank score than another city with a higher green house gas emission. For example, the rank score of a geographic feature may be generated based on the type of businesses within the feature. A city having more businesses that emit less pollution may have a higher rank score than another city having more businesses that emit more pollution. A geographic feature can be on the planet Earth or on, e.g., other planets, stars, or moons. For example, a geographic feature can be a mountain or a crater on Mars, a particular Apollo landing site on the Moon, etc.

The functions or equations used for generating rank scores 122 for the geographic features can be different from those described above. Applications for using the rank scores 122 of the geographic features may be different from those described above. Different types of user interfaces can be used. Moreover, other mechanisms for ranking geographic features or geographically related features may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer program product tangibly stored on a non-transitory computer readable medium and configured to cause a computing device to perform operations comprising:
   identifying a plurality of query contexts for each geographic feature of a plurality of geographic features, and a ranking function corresponding to each of the plurality of query contexts;
   using the identified ranking functions, generating a plurality of rank scores for each geographic feature, each rank score of the plurality of rank scores corresponding to a query context of the plurality of query contexts;
   adjusting the generated rank scores of at least some geographic features of the plurality of geographic features based on rank scores of related geographic features, wherein the generated rank scores of the at least some geographic features depend on a relationship of the at least some geographic features with the related geographic features;
   receiving a query from a query source, the query source including an application program or a website;
   identifying documents that are retrieved in response to the received query;
   identifying at least two geographic features of the plurality of geographic features associated with the identified documents, each identified geographic feature being associated with at least one of the identified documents;
   identifying a context of the received query based at least in part on an evaluation of a type of the application program or a type of the website from which the query was received;
   selecting, based at least in part on the identified context of the received query, a rank score from the generated rank scores for each of the geographic features; and
   providing the identified documents in a sequence that is ordered based at least in part on the selected rank scores.

2. The product of claim 1 wherein the sequence of the documents is also determined based on structures of the documents.

3. The product of claim 1 wherein the sequence is also determined based on opinions of other documents with respect to the documents responsive to the query.

4. The product of claim 1, wherein identifying the context of the query includes identifying a purpose of the query.

5. The product of claim 4 wherein identifying the purpose of the query comprises receiving an input from a user, the input identifying the purpose of the query.

6. The product of claim 4 wherein identifying the purpose of the query comprises evaluating the query to determine the purpose of the query.

7. The product of claim 6 wherein the query comprises one or more key words that are associated with the geographic features, and evaluating the query comprises evaluating the key words.

8. The product of claim 1 wherein the rank scores are generated in real time after the query is received.

9. A computer-implemented method comprising:
   identifying a plurality of query contexts for each geographic feature of a plurality of geographic features and a ranking function corresponding to each of the plurality of query contexts;
   using the identified ranking functions, generating a plurality of rank scores for each geographic feature, each rank score of the plurality of rank scores corresponding to a query context of the plurality of query contexts;
   adjusting the generated rank scores of at least some geographic features of the plurality of geographic features based on rank scores of related geographic features, wherein the generated rank scores of the at least some geographic features depend on a relationship of the at least some geographic features with the related geographic features;
   receiving a query from a query source, the query source including an application program or a website;
   identifying documents that are retrieved in response to the received query;
   identifying at least two geographic features of the plurality of geographic features associated with the identified documents, each identified geographic feature being associated with at least one of the identified documents;

identifying a context of the received query based at least in part on an evaluation of a type of the application program or a type of the website from which the query was received;

selecting, based at least in part on the identified context of the received query, a rank score from the generated rank scores for each of the geographic features; and providing the identified documents in a sequence that is ordered based at least in part on the selected rank scores.

10. The method of claim 9 wherein the sequence of the documents is also determined based on structures of the identified documents.

11. The method of claim 9 wherein the sequence of the documents is also determined based on opinions of other documents with respect to the identified documents.

12. The method of claim 9 wherein identifying the context of the query comprises receiving an input from a user, the input identifying the context of the query.

13. The method of claim 9 wherein identifying the context of the query comprises evaluating the query to determine the context of the query.

14. A system comprising:
one or more computing devices configured to perform operations comprising:
identifying a plurality of query contexts for each geographic feature of a plurality of geographic features and a ranking function corresponding to each of the plurality of query contexts;
using the identified ranking functions, generating a plurality of rank scores for each geographic feature, each rank score of the plurality of rank scores corresponding to a query context of the plurality of query contexts;
adjusting the generated rank scores of at least some geographic features of the plurality of geographic features based on rank scores of related geographic features, wherein the generated rank scores of the at least some geographic features depend on a relationship of the at least some geographic features with the related geographic features;
receiving a query from a query source, the query source including an application program or a website;
identifying documents that are retrieved in response to the received query;
identifying at least two geographic features of the plurality of geographic features associated with the identified documents, each identified geographic feature being associated with at least one of the identified documents;
identifying a context of the received query based at least in part on an evaluation of a type of the application program or a type of the website from which the query was received;

selecting, based at least in part on the identified context of the received query, a rank score from the generated rank scores for each of the geographic features; and providing the documents in a sequence that is ordered at least partially based on the selected rank scores.

15. The system of claim 14 wherein the rank scores are derived from one or more properties of the geographic features associated with the documents and are independent of structures of the documents.

16. The system of claim 14 wherein the rank scores are updated in real time when a search engine requests the rank scores.

17. A system comprising:
means for identifying a plurality of query contexts for each geographic feature of a plurality of geographic features and a ranking function corresponding to each of the plurality of query contexts;
means for generating a plurality of rank scores for each geographic feature using the identified ranking functions, each rank score of the plurality of rank scores corresponding to a query context of the plurality of query contexts;
means for adjusting the generated rank scores of at least some geographic features of the plurality of geographic features based on rank scores of related geographic features, wherein the generated rank scores of the at least some geographic features depend on a relationship of the at least some geographic features with the related geographic features;
means for receiving a query from a query source, the query source including an application program or a website;
means for identifying documents that are retrieved in response to the received query;
means for identifying at least two geographic features of the plurality of geographic features associated with the identified documents, each identified geographic feature being associated with at least one of the identified documents;
means for identifying a context of the received query based at least in part on an evaluation of a type of the application program or a type of the website from which the query was received;
means for selecting, based at least in part on the identified context of the received query, a rank score from the generated rank scores for each of the geographic features; and
means for providing a list of the documents in a sequence that is ordered based at least in part on the selected rank scores.

* * * * *